(12) United States Patent
Hartl et al.

(10) Patent No.: US 9,156,470 B2
(45) Date of Patent: Oct. 13, 2015

(54) CONTROL STRATEGY TO ALTER AVAILABLE WHEEL POWER IN A VEHICLE

(71) Applicant: Ford Global Technologies, LLC, Dearborn, MI (US)

(72) Inventors: Derek Hartl, Royal Oak, MI (US); Ming Lang Kuang, Canton, MI (US); Bernard D. Nefcy, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 13/832,470

(22) Filed: Mar. 15, 2013

(65) Prior Publication Data

US 2014/0277873 A1    Sep. 18, 2014

(51) Int. Cl.
*B60W 30/08* (2012.01)
*B60W 20/00* (2006.01)
*B60W 10/06* (2006.01)
*B60W 10/08* (2006.01)
*B60K 6/445* (2007.10)

(52) U.S. Cl.
CPC ............. *B60W 20/40* (2013.01); *B60K 6/445* (2013.01); *B60W 10/06* (2013.01); *B60W 10/08* (2013.01); *B60W 20/00* (2013.01); *B60W 20/108* (2013.01); *B60W 30/08* (2013.01); *B60W 2550/10* (2013.01); *Y02T 10/6286* (2013.01); *Y10S 903/947* (2013.01)

(58) Field of Classification Search
CPC ...... B60W 30/08; B60W 20/40; B60W 20/00; B60W 20/108; B60W 10/08; B60W 10/06; B60W 2550/10; B60K 6/445; Y02T 10/6286; Y10S 903/947
See application file for complete search history.

(56) References Cited

U.S. PATENT DOCUMENTS

| 7,407,026 | B2 | 8/2008 | Tamor | |
|---|---|---|---|---|
| 7,576,501 | B2 | 8/2009 | Okubo | |
| 7,885,737 | B2 | 2/2011 | Hirata | |
| 2004/0193347 | A1* | 9/2004 | Harumoto et al. | 701/45 |
| 2011/0276216 | A1* | 11/2011 | Vaughan | 701/29 |

* cited by examiner

*Primary Examiner* — John Q Nguyen
*Assistant Examiner* — Michael Kerrigan
(74) *Attorney, Agent, or Firm* — David B. Kelley; Brooks Kushman P.C.

(57) ABSTRACT

A hybrid electric vehicle includes an engine and an electric machine for providing propulsion forces to wheels of the vehicle. In an electric-only propulsion mode, the engine is disabled and the electric machine acts as the power source for the wheels. In a hybrid propulsion mode, the engine is activated to act as an additional power source for the wheels. At least one controller along with a plurality of sensors and positional information devices activate an active safety control signal in response to objects surrounding the vehicle that pose a threat to a potential collision event. In response to the active safety control signal, the engine can be either automatically started or stopped to provide additional available power or a reduced available power, respectively.

19 Claims, 4 Drawing Sheets

CONTROL STRATEGY TO ALTER AVAILABLE WHEEL POWER IN A VEHICLE

TECHNICAL FIELD

The present disclosure relates to a vehicle and a control system for controlling the vehicle. Specifically, the present disclosure relates to a control strategy to control available wheel power in a hybrid vehicle.

BACKGROUND

In a hybrid electric vehicle (HEV), either or both of an internal combustion engine and an electric motor are capable of selectively supplying tractive power to the wheels of the vehicle. In an electric-only drive mode, the electric motor, battery, and inverter (and other components) provide tractive power to the wheels while the engine is disabled (i.e., "off"). In a hybrid drive mode, both the engine and the electric components combine to provide tractive power to the wheels. Available torque and power is maximized when the vehicle is operating in the hybrid drive mode and both the engine and electric motor are immediately available to provide power to the wheels.

Recently, advancements in vehicular safety have been made to better warn the driver and prepare the vehicle in case of an upcoming impact event. For instance, vehicles may provide visual and/or audible alerts to the driver in response to detected dangers on the road. Autonomous braking has developed in which the vehicle automatically applies brake pressure to the wheels in order to avoid a possible collision scenario detected in front of the vehicle. There exists a need to develop additional active safety features, specifically in HEVs.

SUMMARY

According to one embodiment, a hybrid electric vehicle comprise an engine and an electric machine that are both drivably connected to the wheels, such that the vehicle can transmit torque to the wheels via either one or both of the engine or electric machine. The vehicle additionally comprises at least one controller. The at least one controller is configured to command tractive wheel power from the electric machine while the engine is disabled in an electric-only propulsion mode. In the electric-only propulsion mode, a commanded wheel power is limited to a first available power limit. In response to an active safety control signal in a collision avoidance system, the at least one controller is configured to activate the engine to activate a hybrid propulsion mode in which both the engine and electric machine are readily available to transmit torque to the wheels. Activating the engine enables the commanded tractive power to increase above the first available power limit to a second available power limit due to the additional available power provided by the engine.

According to another embodiment, a hybrid electric vehicle comprises an engine and an electric machine, both for providing power to the wheels of the vehicle. At least one controller is provided. The at least one controller is configured to command tractive power to the wheels from both the electric machine and the engine in a hybrid propulsion mode. The at least one controller is further configured to disable the engine and command an electric-only propulsion mode in response to an active safety control signal that indicates a possible upcoming collision event.

When the engine is enabled in the hybrid propulsion mode, the at least one controller commands a wheel power to increase towards a first available power limit. The at least one controller reduces available tractive power at the wheels to a second available power limit that is less than the first available power limit due to the disabling of the engine.

According to yet another embodiment, a method of controlling power in a hybrid electric vehicle includes at least one of stopping and starting an engine in response to an active safety control signal in a collision avoidance system. Tractive power is limited to a first available power limit from a high voltage battery with the engine deactivated. Stopping or starting the engine changes the available power limit accordingly. In one embodiment, stopping or starting the engine is defined by starting the engine in response to the active safety control signal such that available tractive power at the wheels is limited to a second available limit that is greater than the first available power limit. In one embodiment, the method includes altering a rate of change of a commanded wheel power based upon the starting of the engine, and inhibiting stopping of the engine based upon the active safety control signal being ON while the commanded wheel power and a demanded wheel power decrease below the first available power limit.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
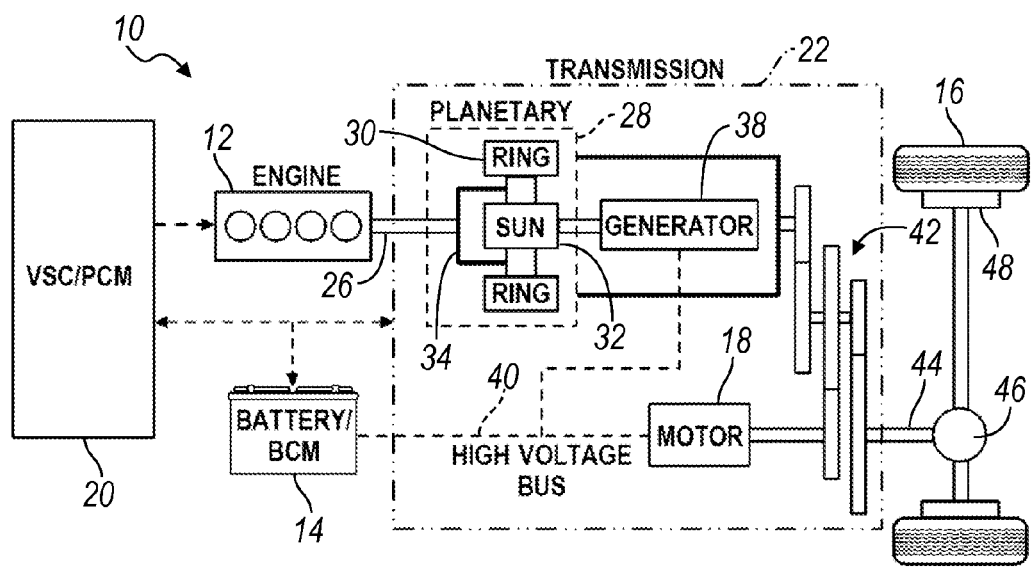
FIG. 1 is a schematic illustration of a powertrain of a hybrid electric vehicle according to one embodiment of the present disclosure.

Referring to FIG. 1, a hybrid electric vehicle (HEV) includes a power-split powertrain 10 in which either or both of an internal combustion engine 12 and a high voltage battery, or electric traction battery 14, provide tractive power to wheels 16 of the vehicle. The battery 14 has a two-way electrical connection, whereby it receives and stores electric energy (e.g., via regenerative braking) and also supplies the energy to an electric traction motor/generator 18, or "electric machine". A vehicle system controller (VSC) and/or powertrain control module (PCM) 20 controls operation of the engine 12, the battery 14 and the electric machine 18. Both the engine 12 and the electric machine 18 are capable of powering a transmission 22 that ultimately delivers torque to the wheels 16 of the vehicle.

The battery 14 can include its own designated battery control module (BCM) electrically connected thereto for controlling the operation of the battery 14. Alternatively, the VSC/PCM 20 can directly control the operation of the battery 14. Other power control modules can exist. It should be understood that throughout this disclosure, the VSC/PCM 20, the BCM and other control modules that control the power flow throughout the powertrain 10 can be collectively referred to as "controllers".

In the power split powertrain 10, the engine 12 delivers power to a torque input shaft 26 that is connected to a planetary gear set 28 through a one way clutch (not shown). The planetary gear set 28 that includes a ring gear 30, a sun gear 32, and a planetary carrier assembly 34. The input shaft 26 is driveably connected to the carrier assembly 34 to power the planetary gear set 28. The sun gear 32 is driveably connected to a generator 38. The generator 38 may be selectively engaged with the sun gear 32 via a clutch (not shown), such that the generator 38 may either rotate with the sun gear 28, or not rotate with it. When the one way clutch (not shown) couples the engine 12 to the planetary gear set 28, the generator 38 generates energy as a reactionary element to the operation of the planetary gear set 28. Electric energy generated from the generator 38 is transferred to the battery 14 through electrical connections 40 and a high voltage bus. The battery 14 also receives and stores electric energy through regenerative braking, in known fashion. The battery 14 supplies the stored electric energy to the electric machine 18 for operation. The portion of the power delivered from the engine 12 to the generator 38 may also be transmitted directly to the electric machine 18. The battery 14, electric machine 18, and generator 38 are each interconnected in a two-way electric flow path through electrical connections 40.

The vehicle may be powered by the engine 12 alone, by the battery 14 and electric machine 18 alone, or by a combination of the engine 12 with the battery 14 and electric machine 18. In a first mode of operation ("hybrid mode of operation," "hybrid propulsion mode," etc.) the engine 12 is activated to deliver torque through the planetary gear set 28. The ring gear 30 distributes torque to step ratio gears 42 comprising multiple meshing gear elements. Torque is distributed from the ring gear 30, through the gears 42 and to a torque output shaft 44. In the first mode of operation, the electric machine 18 may also be activated to assist the engine 12 in propelling the vehicle by transferring torque through the gears 42 to the torque output shaft 44.

In a second mode of operation ("electric-only propulsion mode," "EV mode," etc.), the engine 12 is disabled or otherwise prevented from distributing torque to the output shaft 44. In the second mode of operation, the battery 14 powers the electric machine 18 to distribute torque through the step ratio gears 42 and to the torque output shaft 44.

In either or both of the first mode of operation and the second mode of operation, the VSC/PCM 20 controls the engine 12, battery 14, electric machine 18 and generator 38 in order to distribute torque to the torque output shaft 44. The torque output shaft 44 is connected to a differential and axle mechanism 46 which distributes torque to power the wheels 16. Brakes 48 are also provided, and may be controlled by the VSC/PCM 20 or by another controller.

It should be understood that either or both of the electric machine 18 and generator 38 can each generate electric power or provide propulsion power in methods described above. Both of the electric machine and the generator 38 can interchangeably be referred to as either a motor or a generator, or broadly as an electric machine.

While FIG. 1 illustrates an embodiment in which the powertrain 10 is a powersplit powertrain, for purposes of the present disclosure the powertrain 10 may be any hybrid powertrain configuration. For example, the powertrain may be a modular hybrid transmission (MHT) in which an output rod of an engine and an input rod of a motor/generator selectively engaged via a clutch such that either or both of the engine and motor/generator can provide torque to a transmission along one rotatable shaft. The present disclosure can also be applied to start-stop systems in hybrid or non-hybrid vehicles in which the engine automatically stops and restarts to reduce the amount of time idling. Other hybrid powertrain and transmission configurations exist, and the powersplit configuration of FIG. 1 is but one example.

In hybrid and non-hybrid vehicles, sensors may be placed about the vehicle to detect the relative position of the vehicle relative to external objects, such as other vehicles. These sensors may be used in combination with positional information devices such as cameras, radar and other devices to detect objects surrounding the vehicle. Controllers in the vehicle can activate various mechanisms or systems in the vehicle to reduce the chances of an impact by alerting the operator or preparing the vehicle for a collision event. For example, the combination of sensors and positional information devices can determine the relative position of another object generally in front of the vehicle, and the controllers can automatically activate the brakes of the vehicle if the distance between the vehicle and the other object is quickly reducing. This is known as "automatic braking" In another example, the sensors and positional information devices can warn the driver (e.g., visually, audibly, or vibrating the steering wheel) when the vehicle begins to drift out of its lane and/or automatically take steps to ensure the vehicle stays in its lane during driving. This is known as "lane departure warning systems." In yet another example, the brakes of the vehicle may be activated upon the detection of the vehicle turning too fast. This is known as part of an "electronic stability control" system.

These systems are examples of systems that will be referred to as "active safety control systems" in this present disclosure. It should be understood that these disclosed systems are mere examples of safety systems includes in an active safety control system. Other such positional detection and accident preventative systems can be classified as active safety control systems, in which the vehicle warns the occupants or automatically takes actions to help avoid accidents or reduce the harm of an upcoming accident.

As part of an active safety control system, the present disclosure relates to the operation of the engine and other powertrain components of a vehicle. Disclosure is provided below regarding a system that intelligently times the activation and deactivation of an engine in an active safety control system.

Figure 2:
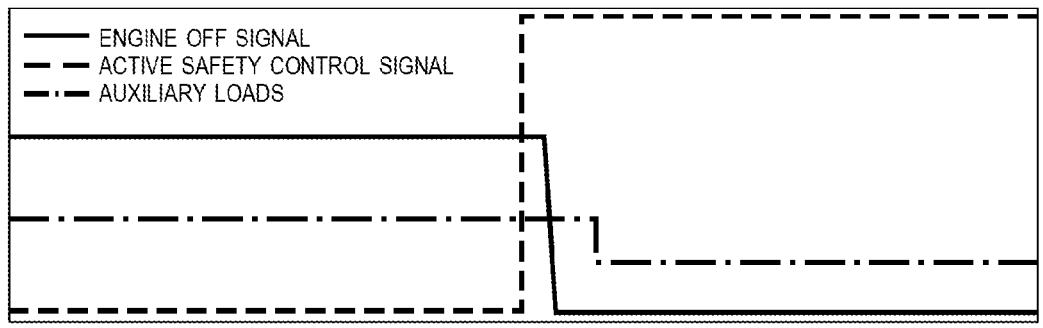
FIG. 2 is a graphical illustration of an "engine off" command and an active safety control signal status over time.

Referring to FIG. 2, a graph representing an "engine off" signal is shown in relation to an active safety control signal. In the first portion of the graph, the "engine off" signal is ON, which represents the engine 12 being disabled, deactivated, or otherwise OFF such that it is not outputting torque. This may be the case, for example, when the vehicle is operating in an electric-only propulsion mode in which the battery 14 and electric machine 18 provide the necessary torque to propel the vehicle. The active safety control signal is also OFF, indicating that the vehicle is not detecting a likelihood of a collision by methods described above.

The active safety control signal is then activated and ON, indicating the possibility of a collision determined by methods described above. The active safety control system is then activated. In one example, sensors about the vehicle and positional information devices indicate another vehicle quickly approaching the vehicle from behind, and the active safety control signal is activated indicating the possibility of a rear impact. In response to the active safety control signal, the "engine off" signal is deactivated and turned OFF. This enables the engine 12 to immediately activate and become available to provide additional power and torque to the wheels 16. The additional torque and tractive power available from the engine 12 may be beneficial, for example, so that the operator of the vehicle can quickly accelerate and/or move laterally with maximum available power to avoid a possible collision.

In addition to the engine disabling in response to the active safety control signal, the auxiliary loads in the vehicle may also be disabled. Auxiliary loads can be attributed to lights, windshield wipers, sound system (e.g., radio), HVAC units, and other sub-systems in the vehicle. These auxiliary loads can be powered by an auxiliary battery, or the traction battery 14 in different embodiments. By turning off at least some of the auxiliary loads, additional power is immediately available to the driver of the vehicle.

Figure 3:
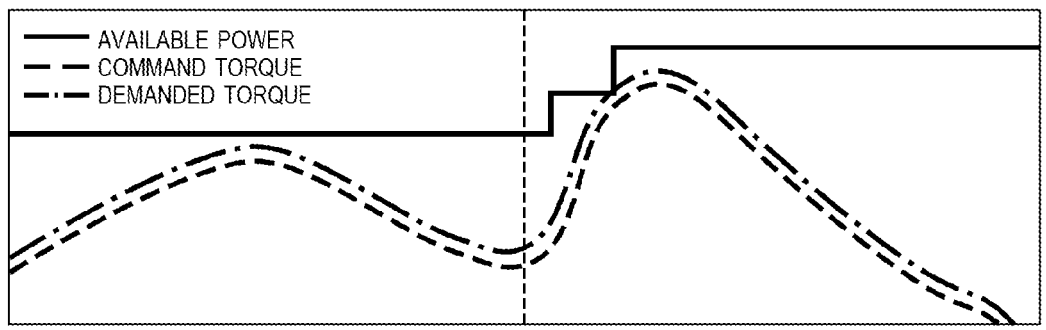
FIGS. 3-4 are graphical illustrations of demanded and commanded torques over time in relation to engine operation and the active safety control signal.

Referring to FIG. 3, the engine ON/OFF status along with a driver demanded torque and a commanded torque are shown during the same timeline of events of FIG. 2. "Driver demanded torque" refers to the amount of torque requested by the driver, as indicated by accelerator and brake pedal position (for example), whereas "commanded torque" refers to the amount of total tractive torque commanded by the controllers and sent to the wheels 16 of the vehicle. It should be understood that while "torque" demands and commands are illustrated in FIGS. 3-4, the term "power" can also be substituted to represent the overall driver demanded power and commanded power at the wheels.

Similar to the illustration shown in FIG. 2, in FIG. 3 the engine 12 is initially OFF and deactivated. The initial total amount of power available is an engine-OFF-available-power limit, or first available power limit. The engine 12 is then activated ("pulled-up") in response to the active safety control signal. This increases the total amount of torque available to an engine-ON-available-power limit, or a second available power limit. By activating the engine 12, the vehicle changes from an electric-only propulsion mode to a hybrid-propulsion mode in which both the engine 12 and electric machine 18 are available to provide propulsion power to the wheels 16. This increases the available power from the first available power limit to the second available power limit, allowing for up to 100% of the driver demanded torque to be matched by the commanded torque, even as the driver demanded torque increases above the first available power limit. If the auxiliary loads are also disabled as previously described, the total amount of torque available may increase to another higher power limit, or a third available power limit, as seen in FIG. 3 as the second increase in available power when the auxiliary power is disabled.

Figure 4:
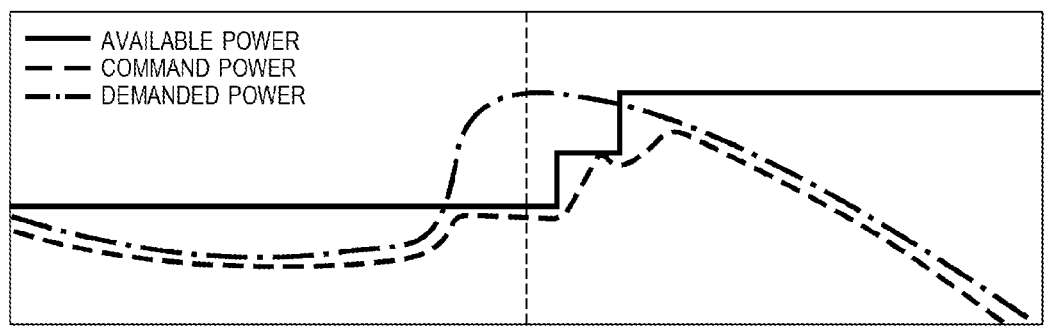

Referring to FIG. 4, a similar graph of available torque/power is provided. In this illustration, the operator of the vehicle begins to demand acceleration much sooner than when the active safety control signal is activated when compared to FIG. 3. The spike in the driver demanded torque shows the moment the operator requests acceleration. Because the available power is limited to the first available power limit, the commanded torque is capped at the first available power limit. Once the active safety control signal is activated to pull-up the engine 12, the available power limit increases to the second limit, enabling the commanded power to increase toward the driver demanded torque. If the controller is also commanded to disable the auxiliary loads, the available power increases again, allowing the commanded torque to further increase toward the demanded torque level, if needed. The commanded torque is slew rate limited or filtered until it matches the driver demanded torque.

The filter that limits and provides a slew rate can be adjusted in differing circumstances. For example, if the driver demanded torque has exceeded the first available power limit for a time greater than a threshold, the filter may be reduced such that when the engine 12 is pulled-up the commanded torque increases at a faster rate toward the driver demanded torque. The filter may also be reduced depending on the amplitude of the driver demanded torque when the active safety control signal is activated. For example, when the operator of the vehicle has a 100% demand in acceleration (accelerator pedal fully depressed), the filter may be minimized to allow the commanded torque to sharply increase once the engine 12 is activated.

As indicated in both FIGS. 3 and 4, the engine remains ON when the active safety control signal is ON, regardless of the driver demanded torque. In other words, even if the operator fully releases the accelerator pedal and the demand for tractive power goes to 0, the engine 12 remains activated while the active safety control signal is ON. This maximizes the available power limit regardless of demand in case the operator has a change-in-mind of demands, the chances of which may be relatively high during times in which the vehicle detects the possibility of an impact event. It should be understood that this embodiment is not necessary but rather optional according to the present disclosure.

It should be understood that while FIGS. 3 and 4 illustrate an embodiment in which the engine 12 is activated to provide additional torque, the engine 12 can also be deactivated in response to the active safety control signal to reduce the total available torque pursuant to methods described herein. While the engine is initially ON, the available power limit is at a first available power limit that is greater than a second available power limit when the engine is disabled in response to the active safety control signal. The commanded torque is capped at each available power limit. Similar to FIGS. 3 and 4, in an embodiment in which the engine 12 is disabled in response to the active safety control signal, the controller may inhibit the engine 12 from starting while the active safety control signal is still ON. This limits the commanded torque to the first available torque limit until the active safety control signal turns OFF.

Figure 5:
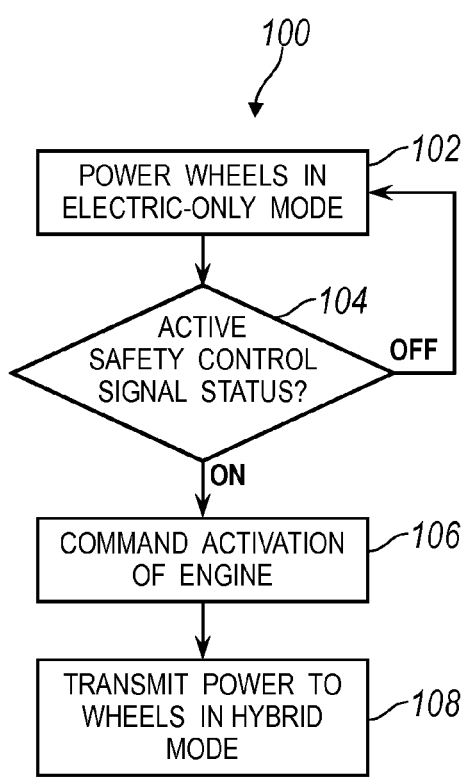
FIG. 5 is a flowchart illustrating an algorithm for activating an engine in a vehicle.

Referring to FIG. 5, a flowchart illustrating an algorithm 100 for operation of a system or method for activating the engine 12 is illustrated. The algorithm may be implemented by the VSC/PCM 20 or other controller(s) in the vehicle. The powertrain 10 of the vehicle provides power to the wheels 16 in an electric-only mode of operation at operation 102. In the electric-mode of operation, the engine 12 is disabled and the traction battery 14 and electric machine 18 act as the power supply to the wheels 16. At operation 104, a continuous check is run to determine if the active safety control signal is either ON or OFF, according to methods previously described. If the active safety control signal is OFF, the algorithm returns and repeats the continuous check. If the active safety control signal is ON, then the engine 12 is pulled-up and activated at operation 106. This enables additional power to be transmitted to the wheels 16. At operation 108, if the demand for acceleration is beyond a threshold, the vehicle operates in a hybrid-mode in which the engine 12 then transmits power to the wheels 16 along with the electric machine 18.

Figure 6:
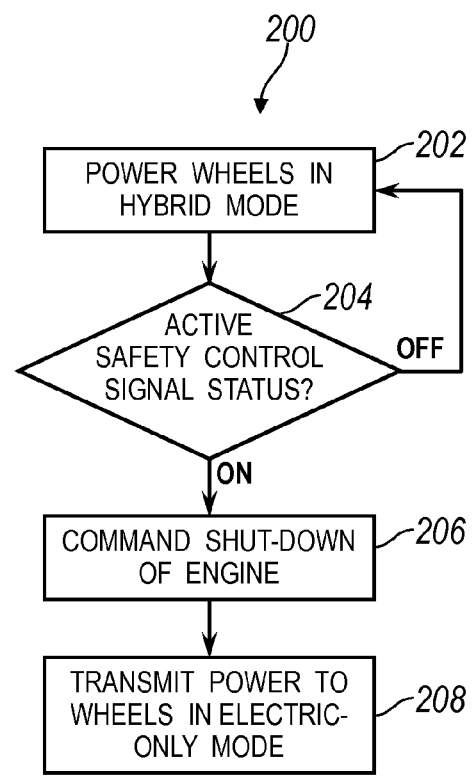
FIG. 6 is a flowchart illustrating an algorithm for deactivating an engine in a vehicle.

Referring to FIG. 6, a flowchart illustrating an additional algorithm 200 for operating a system or method for deactivating an engine 12 is illustrated. The powertrain 10 of the vehicle provides power to the wheels 16 in a hybrid-mode at operation 202, in which both the engine 12 and electric machine 18 transmit power to the wheels 16. The active safety control signal is then monitored at operation 204. If the active safety control signal is ON, the controller commands a shut-down of the engine at operation 206. This reduces the available power limit such that less power is available for transferring to the wheels 16. In response to the active safety control signal, the controller may also inhibit, disable, or otherwise override the regenerative braking commands such that energy is not absorbed through the regenerative braking system. This may also be accomplished by setting the regenerative power limit to 0. At operation 208, power is transmitted to the wheels 16 in the electric-only mode described above. The algorithm illustrated in FIG. 6 for transitioning from the hybrid-mode to the electric-only mode helps reduce the torque transmitted to the wheels 16 in the event the operator of the vehicle is accelerating while an object is quickly approaching the front of the vehicle, for example.

Figure 7:
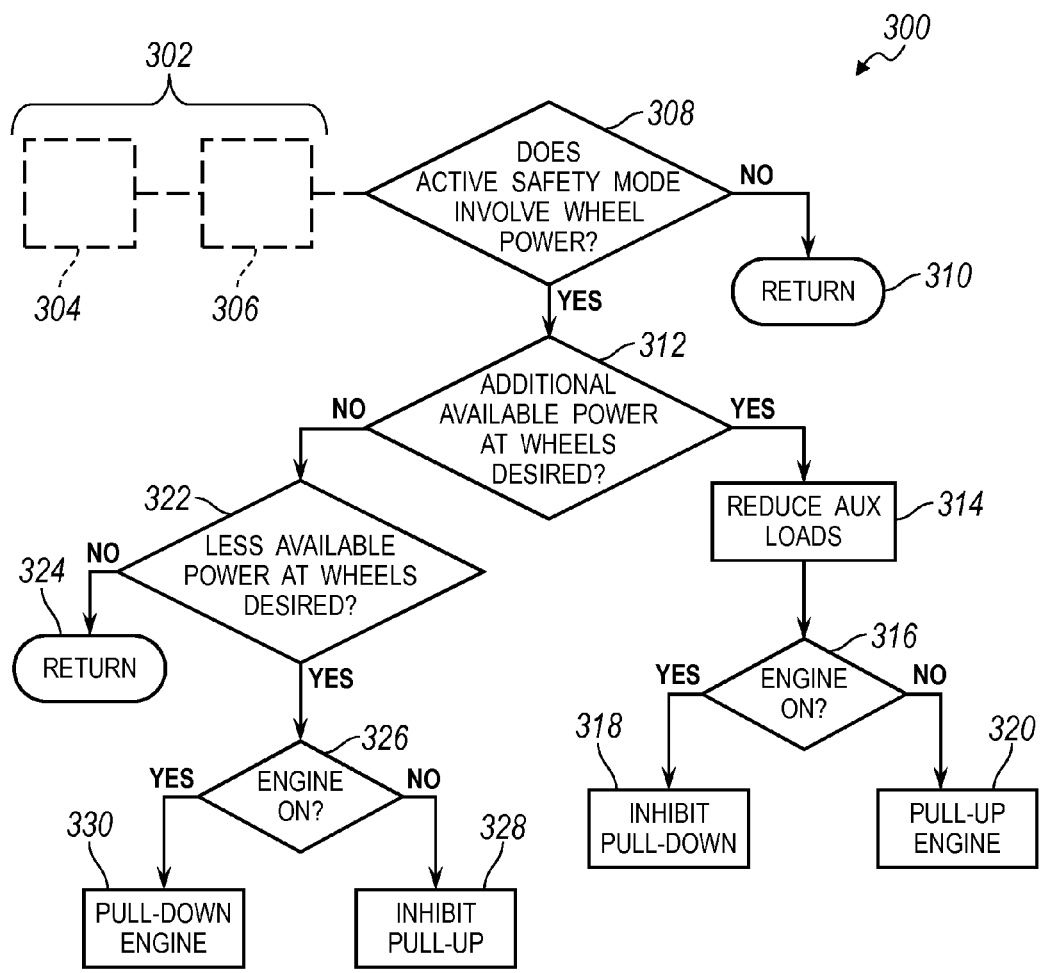
FIG. 7 is a flowchart illustrating an algorithm implemented in response to the active safety control signal for controlling the engine.

Referring to FIG. 7, a flowchart illustrating an algorithm 300 of the control of the powertrain 10 is illustrated according to one embodiment of the present disclosure. The algorithm 300 represents one of many potential algorithms in a collision avoidance system or an active safety control system 302. The collision avoidance system or active safety control system 302 may have many separate systems and algorithms 304, 306 for controlling other components of the active safety control system 302, such as the brakes, seat belts, providing alerts to the driver, and other active safety control system components.

At operation 308 of the active safety control system 302, the controller determines if actions need to be taken to alter the wheel power while the active safety control signal is ON. In other words, while many other actions may take place in response to the active safety control signal, the algorithm illustrated in FIG. 7 is implemented if power to the wheels 16 is involved. If there is no wheel power involved in the active safety control system, the method returns at operation 310. The method proceeds to operation 312 if wheel power is indeed involved.

At operation 312, the controller determines if additional available power at the wheels is desired. This is preferably determined based upon the detection of objects surrounding the vehicle as described above. For example, additional power may be desired if an object is quickly approaching the vehicle. Alternatively, this determination can also be based on the amplitude of driver demanded torque. For example, if the driver demanded torque is higher than the engine-off-available-torque limit at the time the active safety control signal is ON, additional available power may be desired.

If additional available power is indeed desired at operation 312, the controller may command the sources of additional auxiliary loads to be disabled, according to methods previously described, at operation 314. At operation 316, the controller and other sensors determine whether the engine 12 is ON and activated. If the engine 12 is ON, then the controller commands an inhibition of engine pull-down at operation 318. By inhibiting the engine from pulling down, other demand sensors possibly indicating the desire to disable the engine will be nullified such that full, immediate power is available for the driver. If the engine 12 is OFF, then the engine 12 is pulled-up at operation 320 to provide additional available power.

If a determination is made that no additional power is desired at operation 312, then a determination is made as to whether less available power is desired at the wheels at operation 322. If not, the method returns at operation 324. If less available power is indeed desired as described by the methods above, then the controller and other sensors determine the operating state of the engine 12 at operation 326. If it is determined that the engine 12 is OFF at operation 326, the controller inhibits engine pull-up at operation 328. By inhibiting the engine from pulling down, other demand sensors possibly indicating the desire to enable the engine will be nullified such that a reduced power limit is available to the driver, regardless of the actual demand readings. However, if the engine 12 is ON at operation 326, then the controller commands a pull-down or disabling of the engine 12 at operation 330. This reduces the overall available power limit from the first available power limit to the second available power limit, as previously described.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid electric vehicle comprising:
an engine drivably connected to wheels;
an electric machine drivably connected to the wheels; and
at least one controller configured to (i) command tractive wheel power from the electric machine while the engine is disabled in an electric-only propulsion mode, and (ii) in response to an active safety control signal in a collision avoidance system, activate the engine and increase available power for an upcoming increase in commanded tractive power.

2. The vehicle of claim 1, wherein the at least one controller is further configured to inhibit a commanded tractive power from increasing above a first available power limit when the engine is disabled, and wherein activating the engine enables the commanded tractive power to increase above the first available power limit in response to the active safety control signal.

3. The vehicle of claim 2, wherein the at least one controller is further configured to enable the commanded tractive power to increase to a second available power limit when the active safety control signal is ON, wherein the second available power limit is greater than the first available power limit.

4. The vehicle of claim 2, wherein the at least one controller is further configured to, based upon the active safety control signal being ON and the engine being activated, inhibit the engine from disabling when a demanded wheel power and the commanded tractive power each decrease below the first available power limit.

5. A hybrid electric vehicle comprising:
an engine for providing power to wheels;
an electric machine for providing power to the wheels; and
at least one controller configured to (i) command tractive power to the wheels from the electric machine and the engine, and (ii) in response to an active safety control signal indicating a possible upcoming collision event, disable the engine and decrease available power for an upcoming decrease in commanded tractive power.

6. The vehicle of claim 5, wherein the at least one controller is further configured to (i) command a commanded wheel power to increase toward a first available power limit when the engine is enabled in the hybrid propulsion mode, and (ii) reduce available tractive power at the wheels to a second available power limit less than the first available power limit in response to the active safety control signal.

7. The vehicle of claim 6, wherein the at least one controller is further configured to reduce the commanded wheel power to the second available power limit.

8. The vehicle of claim 6, wherein the at least one controller is further configured to, subsequent to the disabling of the engine, inhibit the engine from activating based upon the active safety control signal being ON.

9. The vehicle of claim 8, wherein the at least one controller is further configured to inhibit the engine from activating when a demanded power increases above the available power at the second limit.

10. The vehicle of claim 6, wherein the active safety control signal is activated in response to a change in distance between the vehicle and an object generally in front of the vehicle.

11. A method of controlling power in a hybrid electric vehicle, comprising:
in response to an active safety control signal in a collision avoidance system, stopping or starting an internal combustion engine drivably connected to wheels to alter available wheel power for an upcoming change in commanded tractive power.

12. The method of claim 11, wherein the at least one of starting and stopping is defined by starting the engine such that additional available wheel power is provided in response to the active safety control signal.

13. The method of claim 11, wherein the at least one of starting and stopping is defined by stopping the engine to reduce available wheel power.

14. The method of claim 11, further comprising
limiting tractive power to wheels from a high voltage battery with the engine deactivated to a first available power limit, and
wherein the stopping or starting comprises starting the engine in response to the active safety control signal such that available tractive power at the wheels is limited to a second available power limit greater than the first available power limit.

15. The method of claim 14, further comprising altering a rate of change of a commanded wheel power based upon the starting of the engine.

16. The method of claim 15 further comprising, based upon the active safety control signal being ON, inhibiting stopping of the engine when a demanded wheel power and the commanded wheel power each decrease below the first available power limit.

17. The method of claim 11, wherein the active safety control signal comprises a lane departure warning signal such that the stopping or starting an engine is in response to a lane departure warning signal.

18. The method of claim 11, wherein the active safety control signal is activated in response to a distance between the vehicle and an object generally in front of the vehicle being below a threshold.

19. The method of claim 11, further comprising disabling at least some auxiliary loads in response to the active safety control signal.

* * * * *